(12) United States Patent
Rambaldini et al.

(10) Patent No.: US 11,384,884 B2
(45) Date of Patent: Jul. 12, 2022

(54) COUPLING/UNCOUPLING DEVICE FOR MULTI-COUPLING PLATES

(71) Applicant: Faster S.r.l., Rivolta d'Adda (IT)

(72) Inventors: Mauro Rambaldini, Cernusco sul Naviglio (IT); Massimo Cardi, Pandino (IT)

( * ) Notice: Subject to any disclaimer, the term of this patent is extended or adjusted under 35 U.S.C. 154(b) by 162 days.

(21) Appl. No.: 16/517,664

(22) Filed: Jul. 22, 2019

(65) Prior Publication Data
US 2020/0049293 A1 Feb. 13, 2020

(30) Foreign Application Priority Data
Aug. 7, 2018 (EP) ..................................... 18425064

(51) Int. Cl.
*F16L 37/16* (2006.01)
*F16L 37/20* (2006.01)
*F16L 37/56* (2006.01)

(52) U.S. Cl.
CPC ............... *F16L 37/56* (2013.01); *F16L 37/16* (2013.01); *F16L 37/20* (2013.01)

(58) Field of Classification Search
CPC . F16L 37/56; F16L 37/20; F16L 37/16; F16L 35/00; F16L 37/18; F16L 37/24; F16L 37/242; F16L 37/26; F16L 37/50; F16L 39/04; F16L 23/06; E02F 9/00; A01B 59/042
USPC .......... 285/1, 26, 81, 91, 312, 24, 29, 124.1, 285/394, 396, 358
See application file for complete search history.

(56) References Cited

U.S. PATENT DOCUMENTS

| | | | | |
|---|---|---|---|---|
| 1,481,392 A | * | 1/1924 | Schawrow | F16L 37/16 285/312 |
| 3,059,206 A | * | 10/1962 | Williams | 285/312 |
| 5,507,530 A | * | 4/1996 | Mahaney | F16L 37/56 285/312 |
| 7,258,369 B2 | * | 8/2007 | Martin | F16L 37/56 285/26 |
| 7,670,157 B2 | * | 3/2010 | Miyamoto | |
| 7,703,812 B2 | * | 4/2010 | Asam | F16L 37/56 285/312 |

FOREIGN PATENT DOCUMENTS

| | | |
|---|---|---|
| DE | 202008008692 | 9/2008 |
| EP | 0522493 | 1/1993 |
| JP | 2013007186 | 1/2013 |
| WO | 2007101516 | 9/2007 |

* cited by examiner

*Primary Examiner* — Matthew Troutman
*Assistant Examiner* — William S. Choi
(74) *Attorney, Agent, or Firm* — Themis Law

(57) ABSTRACT

A coupling/uncoupling device for a plate-like multi-coupling device for the simultaneous connection of a plurality of hydraulic, electrical, and/or pneumatic lines includes quick couplings. In particular, the coupling/uncoupling device is provided with a safety device configured to prevent an accidental uncoupling and to be operated by the operator with one hand only. A plate-like multi-coupling device the includes such coupling/uncoupling device is also an object of the present invention.

5 Claims, 5 Drawing Sheets

COUPLING/UNCOUPLING DEVICE FOR MULTI-COUPLING PLATES

FIELD OF THE INVENTION

The present invention relates to a coupling/uncoupling device for a plate-like multi-coupling device for the simultaneous connection of a plurality of hydraulic, electrical, and/or pneumatic lines, comprising quick couplings.

In particular, the coupling/uncoupling device according to the present invention is provided with a safety device adapted to prevent accidental uncoupling.

A plate-like multi-coupling device comprising said coupling/uncoupling device is also the object of the present invention.

BACKGROUND OF THE INVENTION

Plate-like multi-coupling devices for the simultaneous connection of a plurality of hydraulic, electrical, and/or pneumatic lines are known, in particular in the agricultural field for the connection of forks, buckets, hoists and farming equipment in general to be connected for example to a tractor, and well as in the construction sector, in earthmoving machines used for road paving, as well as in jackhammers, and so on.

In light of the above, there is a particularly felt need of being able to connect several hydraulic, electrical and pneumatic lines in an effective and safe manner for the operator performing such operation, i.e. to save time, prevent fluid leaks or air inclusions in the lines during the connection and disconnection steps, and avoid dangerous connection errors such as the inversion of two lines.

Different technical solutions have been developed in response to these needs, among which a multi-connection plate known on the market with the trade name "Multifaster", for certain aspects the object of Italian Patent IT 1271165 and for other aspects the object of European Patents EP 0787905 and EP 0522493, in the name of the present Applicant.

Such multi-connection plate consists of two connecting plates, one of which is connected to an auxiliary device to be connected, and therefore it is movable in that it is on board the utility, while the other in general is connected to the vehicle or to the apparatus to which the auxiliary device is to be connected, and therefore it is fixed on board the vehicle.

Each of the two plates therefore houses a plurality of quick couplings. In particular, the fixed plate preferably is equipped with female semi-couplings, while the movable plate is equipped with corresponding male semi-couplings.

In general, each utility has one outbound and one return line, whereby two pairs of couplings are required for each utility.

The connection and the disconnection of the movable plate to/from the fixed plate occurs thanks to a locking handle or lever, that can easily be gripped by the operator and oscillates around a fulcrum integral with the main body to which the fixed plate is connected.

Said lever in general has one handle-shaped end that can be gripped by the user and is hinged at the two sides of the fixed plate, each of the two stretches of the handle hinged with said plate has a guide or eccentric groove made on a plate-like element capable of receiving suitable pins provided on the movable plate so that the action of said eccentric groove or cam on the pins moves the movable plate close to the fixed plate, thus facilitating the correct insertion of the couplings and keeping the two plates firmly connected during the whole operating period, during which said lever is locked in lowered position.

As mechanical safety, certain multi-coupling plates of the type hereinto described known in the prior art have, at one of the two hinging points of the handle to the plate, a release button that is to be pressed by the operator in order to release the lever so as to then move it from the operating position, in which the lever keeps the plates in mutual coupling position, to the release position, in which the two plates may be uncoupled.

Similarly, in connecting step of the two plates, the handle is brought to closed position and the mechanical safety button device is triggered in the operating position thereof in which it locks the handle itself.

As long as the operator does not push the release button, mechanical abutment elements, such as for example, pawls or bushings, prevent the movement of the lever and therefore the moving away of the two plates and the opening of the multi-connection.

The same applicant is the applicant, among others, of Patents EP0522493, EP2476941 and EP2360413, which illustrate such multi-connection plates.

However, the known systems have certain drawbacks.

More specifically, as was mentioned, the plate-like multi-coupling devices for the simultaneous connection of a plurality of lines of known type comprise coupling/uncoupling devices provided with an anti-release safety button system.

Such solution provides for the operator to press or pull the button in direction perpendicular to the surface of the plate-like element on which the eccentric groove is made.

Such system of known type therefore requires the operator to use one hand to press or pull the safety button and the other hand to move the lever, rotating it, up to disconnecting the two plates.

Such method for implementing the anti-release safety button system of the coupling/uncoupling device of the multi-coupling device of known type makes it impossible for the operator to connect and disconnect the multi-coupling device with one operation alone. Indeed, the operator first is to intervene on the safety button and then move the lever.

In the same manner, the method for implementing the anti-release safety button system of known type requires the operator to intervene, as mentioned, with two hands, and this aspect is felt as a limitation and a disadvantage by the operators who in certain applications tend to operate on the multi-connection device directly from the driving seat of the tractor. The fact of having to operate with both hands on the multi-connection device in certain cases requires a rather inconvenient operation by the operator, or even the need to get off the vehicle to disconnect the multi-connection device.

SUMMARY OF THE INVENTION

In view of the above, it is the task of the present invention to resolve the drawbacks affecting the multi-coupling devices of known types and in particular, affecting the anti-release pin safety systems of the multi-coupling devices of known types.

Within such task, it is an object of the present invention to provide a coupling/uncoupling device for a plate-like multi-coupling device provided with an innovative safety system that allows the operator to connect and disconnect the multi-coupling device with one operation alone.

It is a further object of the present invention to provide a coupling/uncoupling device for a plate-like multi-coupling device provided with an innovative safety system that allows the operator to connect and disconnect the multi-coupling device using one hand alone.

The task disclosed above, and also the objects indicated and others which are more apparent below, are achieved by a coupling/uncoupling device for a plate-like multi-coupling device provided with an innovative safety system according to appended claim 1.

Other features of the coupling/uncoupling device according to the present invention are provided in the dependent claims, which also form an integral part of the present description.

BRIEF DESCRIPTION OF THE DRAWINGS

Further features and advantages shall be more apparent from the description of a preferred, but not exclusive, embodiment of the coupling/uncoupling device according to the present invention, illustrated by mere way of non-limiting example with the aid of the accompanying drawings, in which.

DETAILED DESCRIPTION OF EMBODIMENTS OF THE INVENTION

Figure 1:
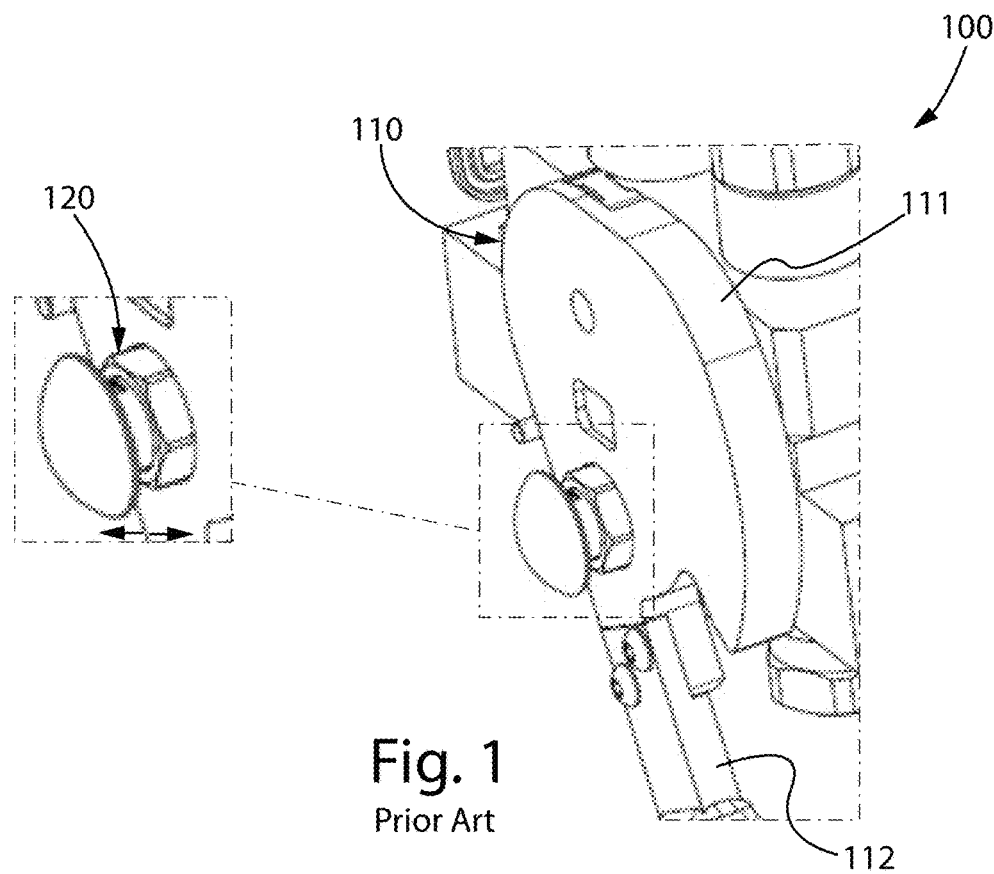
FIG. 1 shows a coupling/uncoupling device of known type, provided with an accidental anti-release safety button device.
Figure 2:
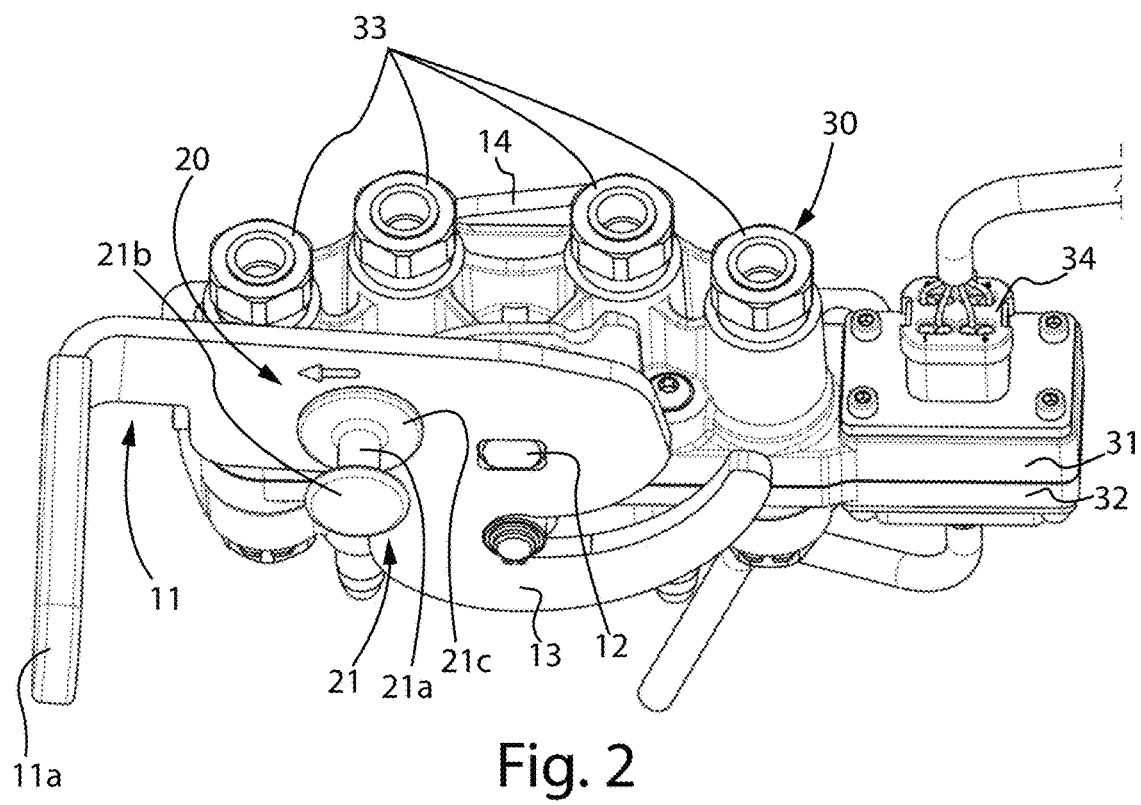
FIG. 2 shows a plate-like multi-coupling device provided with the coupling/uncoupling device according to the present invention.

With particular reference to FIG. 1, plate-like multi-coupling devices 100 for the simultaneous connection of a plurality of lines comprising coupling/uncoupling devices 110 comprising an anti-release safety button system 120 are known in the art.

These types of devices provide for the operator to press or pull the button 120 in a direction perpendicular to the surface of the plate-like element 111 on which the eccentric groove is made.

Such systems of known type, therefore, require the operator to use one hand to press or pull the safety button 120 and the other hand to move the lever 112, rotating it, up to disconnecting the two plates.

With reference to FIGS. 2 to 8, there is illustrated a coupling/uncoupling device 10 for a plate-like multi-coupling device 30 provided with an innovative safety locking system 20 according to the present invention. "Plate-like" is used here to indicate a "plate-shaped" or "planar" body.

In greater detail, with reference to FIG. 1, the plate-like multi-coupling device 30 comprises a plurality of hydraulic, electrical, and/or pneumatic lines as in systems known in the art.

The multi-coupling device 30 according to the invention comprises a first plate 31 that may be connected to an auxiliary device and, therefore, is movable in that it is at the edge of the utility, while the other plate 32 may be connected to the vehicle or to the apparatus to which the auxiliary device is to be connected, and, therefore, is fixed on board of the vehicle.

Each of the two plates, therefore, houses a plurality of quick couplings 33. The connection and the disconnection of the movable plate 31 to/from the fixed plate 32 occurs by means of said coupling/uncoupling device 10 comprising in turn a coupling/uncoupling handle or lever 11 that can easily be gripped by the operator by means of the handle-shaped gripping end 11a and can oscillate about a fulcrum 12 that is integral with the movable plate 31.

The lever 11 of said coupling/uncoupling device 10 is connected to a pair of plate-like elements 13, 14, each hinged on one side of the movable plate 31.

Each of the two plate-like elements 13, 14 of the coupling/uncoupling device 10 is hinged to said plate 31 and has an eccentric guide or groove 13', 14' made on the respective plate-like element 13, 14 and capable of receiving suitable clamping pins 15 provided on the fixed plate 32 so that the action of said eccentric groove or cam 13', 14' on the pins 15 nears the movable plate 31 to the fixed plate 32, thus facilitating the correct insertion of the couplings 33 and keeping the two plates 31, 32 firmly connected during the whole operating period, during which said lever 11 is locked by the safety locking means 20 comprising means 21 that can be operated by the operator to unlock the coupling/uncoupling lever 11.

According to what is shown, for example, in FIGS. 3 to 6, the coupling/uncoupling device 10 according to the present invention comprises safety means 20 in turn comprising a trigger element 21 that can be operated by the user and is associated in a translatable manner with one of said plate-like elements 13, 14 connected to said lever 11 of said coupling/uncoupling device 10.

With particular reference to the accompanying drawings, said trigger element 21 is associated with a first 13 of said plate-like elements 13, 14.

More specifically, said trigger element 21 is slidingly associated with the same plate-like element, for example as illustrated in the figures, with the first plate-like element 13, which comprises said lever 11 provided with a handle gripping end 11a.

Said trigger element 21 advantageously comprises a first portion 21a, 21b, 21c that can be operated by the operator with one finger and projects outwards from said first plate-like element 13, and a second pin portion 22 that projects from said plate-like element 13 towards the inside of the device.

Advantageously, said first portion 21a, 21b, 21c of said trigger that can be gripped by the user comprises a substantially cylindrical intermediate stretch 21a ending towards the outside with a disc element 21b having outer diameter greater with respect to the diameter of said cylindrical intermediate stretch 21a or of shape equally suitable to allow the operator to position a finger around said cylindrical intermediate stretch 21a between said outer disc 21b and a corresponding inner disc 21c adjacent to said first plate-like element 13.

Figure 5:
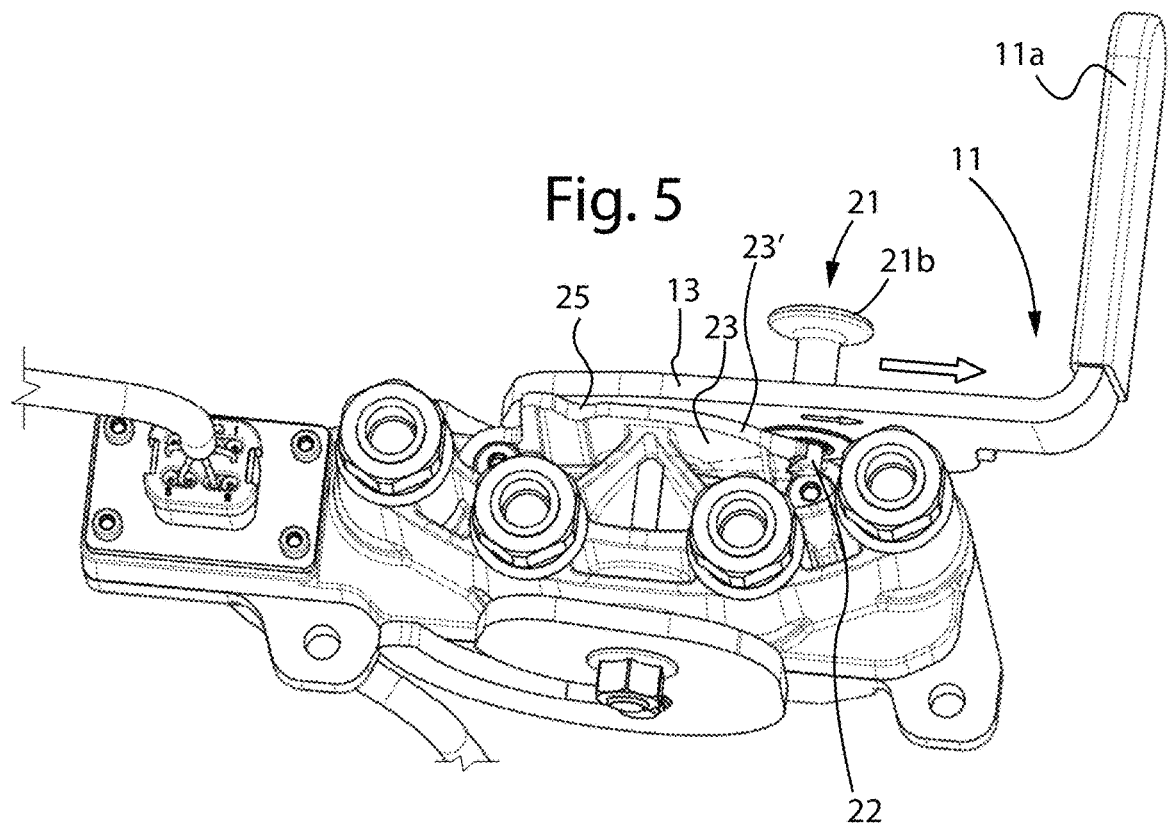
FIG. 5 shows a detail of the coupling/uncoupling device according to the present invention, in which the safety trigger system is engaged.
Figure 6:
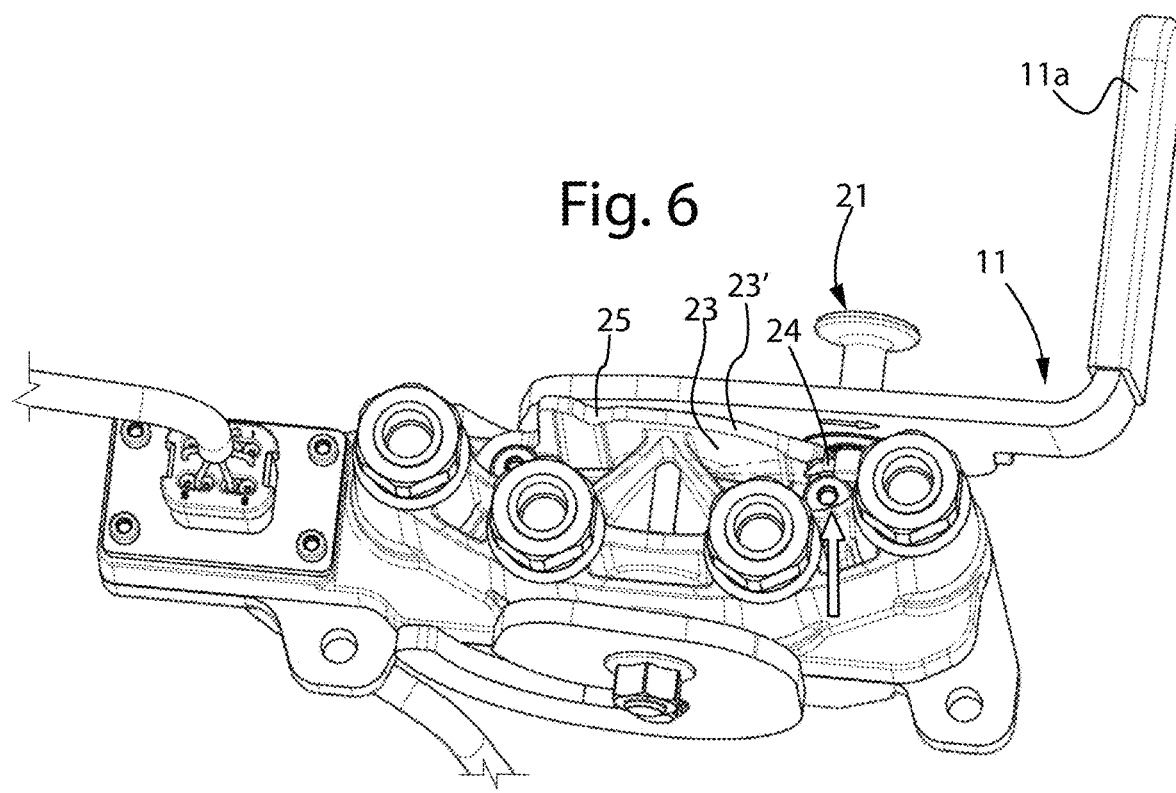
FIG. 6 shows a detail of the coupling/uncoupling device according to the present invention, in which the safety trigger system is disengaged.

As shown with reference to FIGS. 5 and 6, the safety means 20 of said coupling/uncoupling device 10 also comprise a first receiving seat 24 for receiving said second pin portion 22 of said trigger 21, made on the body of said first plate 31, preferably made on a flange 23 that is integral with said first plate 31 and having a curved-profile upper edge 23', and a second receiving seat 25 of said second pin portion 22 of said trigger 21, it also made on said flange 23.

Advantageously, as shown in the figures, said first receiving seat 24 and second receiving seat 25 are made on the curved-profile upper edge 23' of said flange 23.

The safety means 20 of said coupling/uncoupling device comprise said trigger element 21 that can be operated by the user and is associated in a translatable manner with one of the plate-like elements 13, 14 of said coupling/uncoupling lever 11, which in turn comprises a lever 11 provided with handle-shaped gripping end 11a that can easily be gripped by the operator.

Figure 3:
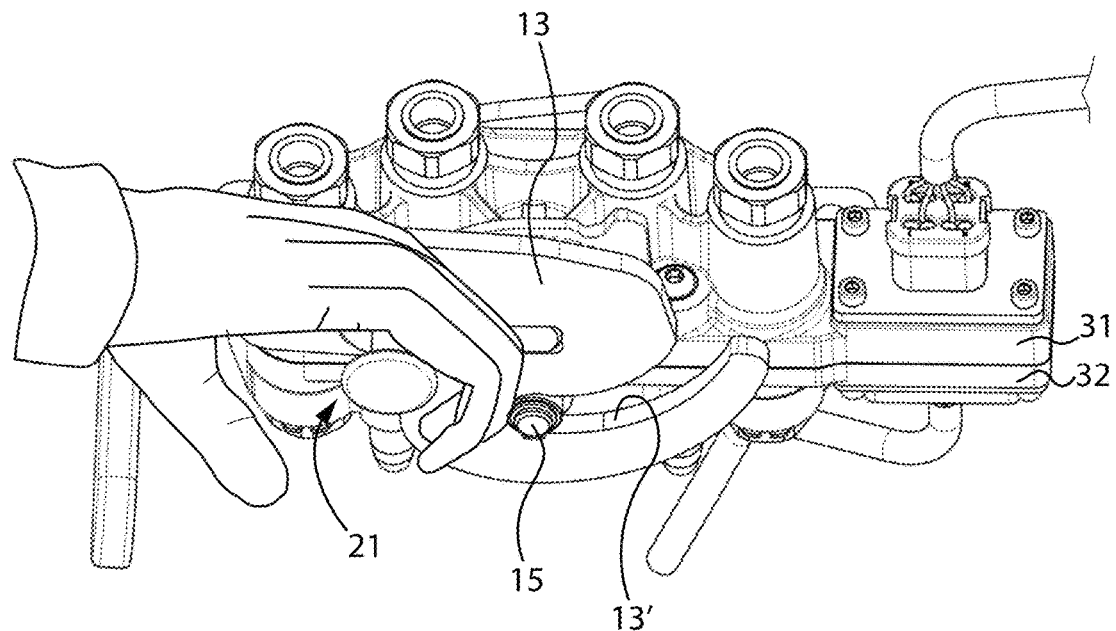
FIG. 3 illustrates a side view of the coupling/uncoupling device assembly of FIG. 2, operated by the operator in release step.
Figure 4:
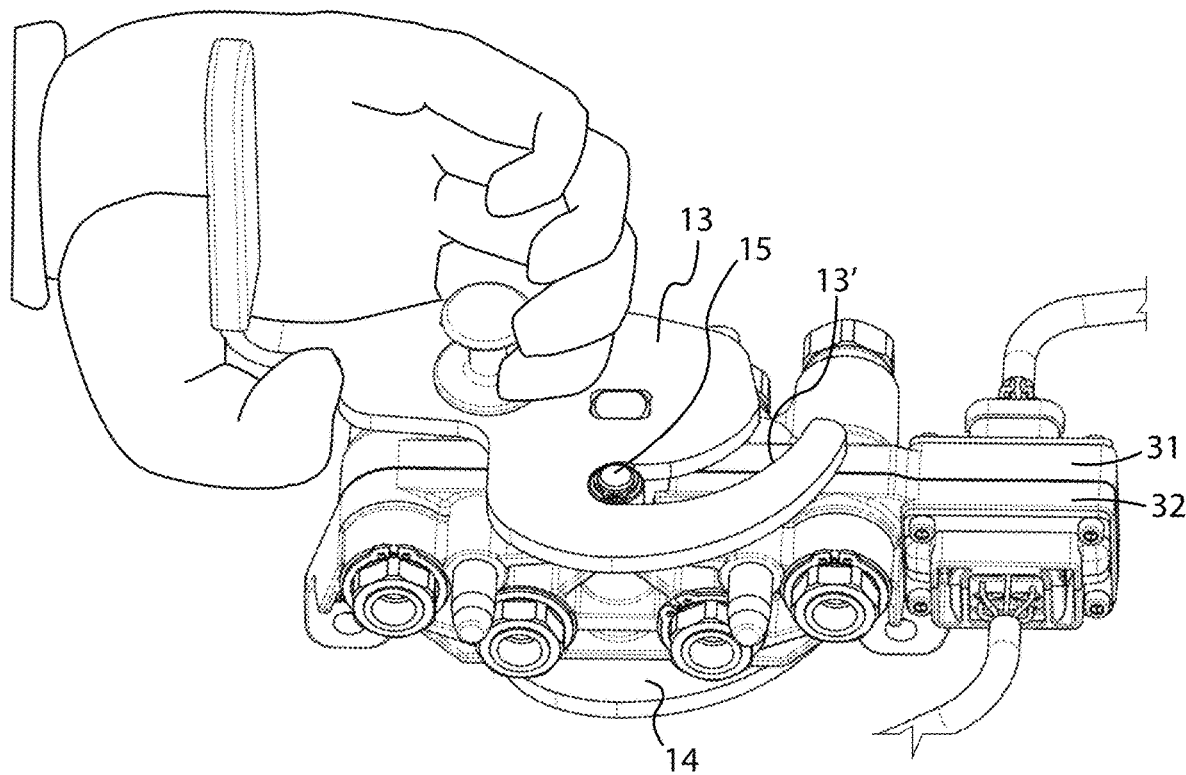
FIG. 4 is a view from a different perspective of the same situation in FIG. 3.

It is now worth noting a situation in which the plates 31, 32 of the multi-coupling device 30 according to the invention are still coupled, as shown for example in FIG. 3. In order to separate/release them, the operator simply grips the handle-shaped gripping unit 11a protruding outwards from said lever 11 connected to said first plate-like element 13 according to that shown in FIG. 3, and retracts the trigger 21 with his/her index finger, as shown in FIG. 4.

With reference to FIGS. 5 and 6, indeed the trigger 21 is associated in a translatable manner with said first plate-like element 13 and is movable between a first locked position in which said pin 22 of said trigger 21 is inserted in said first receiving seat 24 made on said flange 23 of said first plate 31, and a second released position in which said pin 22 of said trigger 21 is inserted in said second receiving seat 25 made on said flange 23 of said first plate 31.

Figure 7:
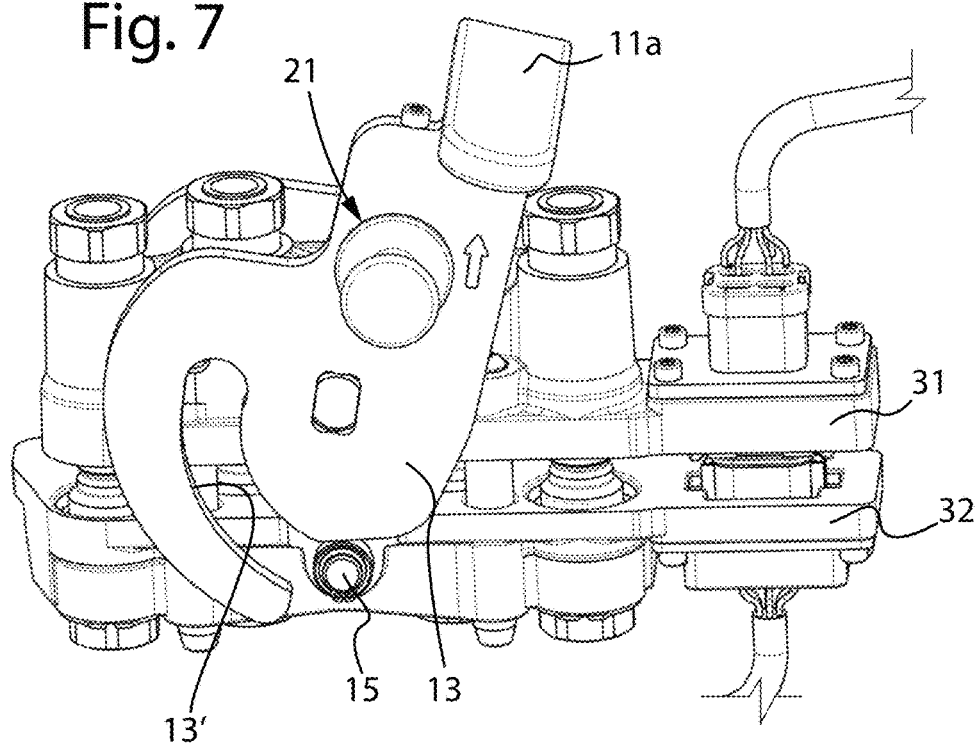
FIG. 7 illustrates a plate-like multi-coupling device according to the present invention, in an initial condition of the uncoupling step of the plates.
Figure 8:
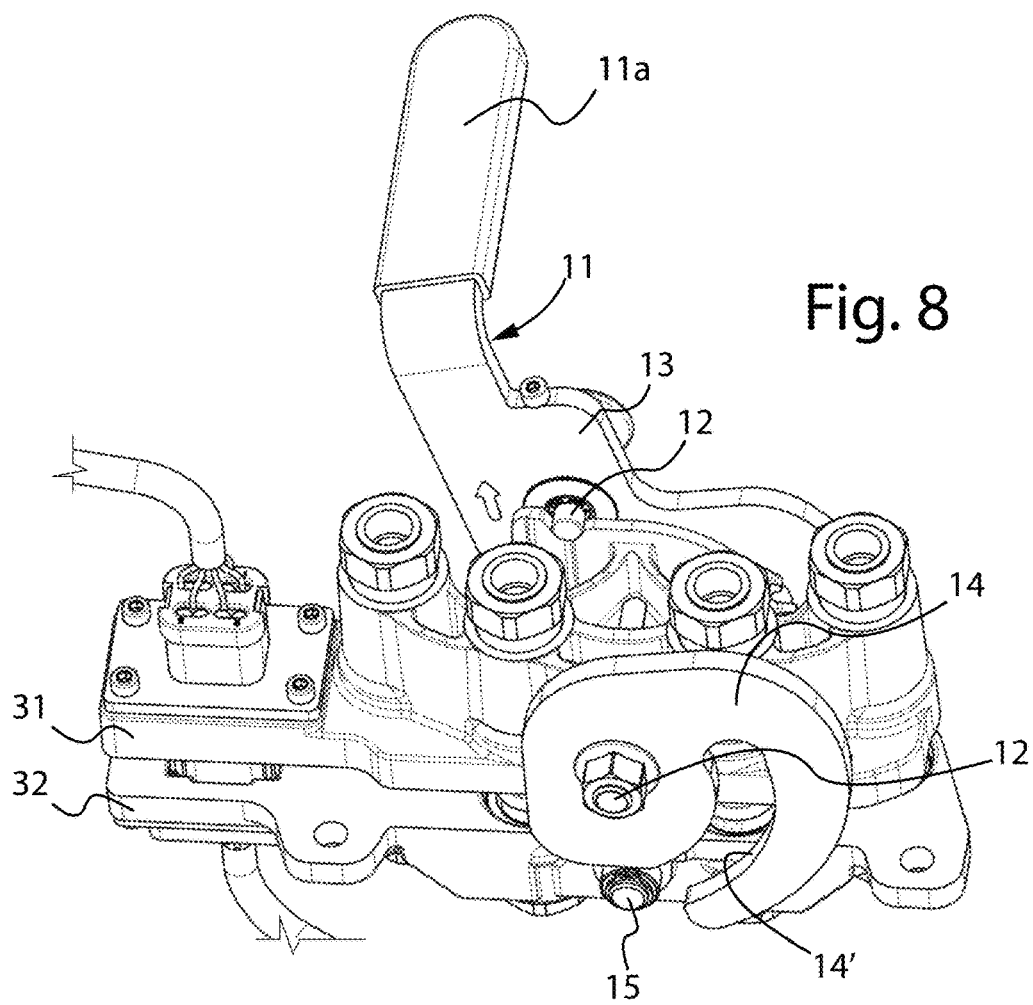
FIG. 8 illustrates the view from the opposite side of the device in the condition in FIG. 7.

As is worth noting for example in FIGS. 6, 7 and 8, when the operator acts on the trigger 21 by retracting it, i.e. causing it to translate towards the gripping handle 11a, the pin 22 of said trigger 21 disengages from the first receiving seat 24 and at this point the operator can rotate the coupling/uncoupling lever 11 by acting on the handle 11a.

Figure 9:
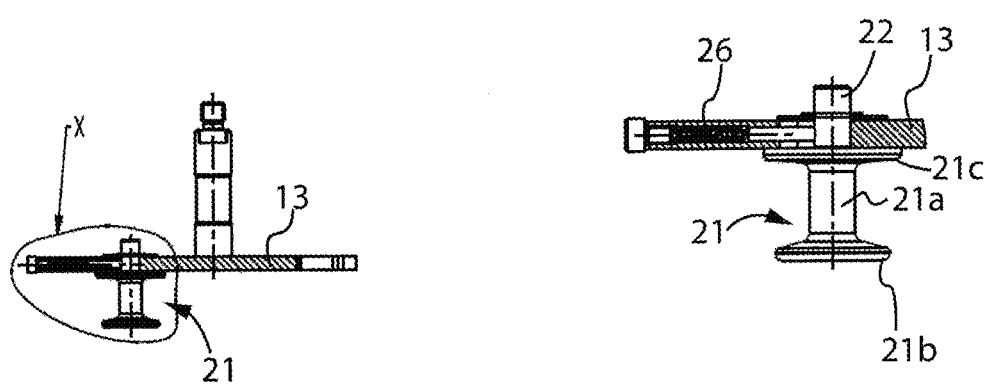
FIG. 9 illustrates a sectional view of a detail of the coupling between the operating trigger and the plate-like element with which said trigger is associated.

Elastic means 26 (shown in FIG. 9) advantageously consisting of a helical spring are placed between the trigger 21 and the plate-like element 13 and act to keep said trigger in the advanced position in which, with the lever 11 lowered, the pin 22 of said trigger 21 is engaged in said first receiving seat 24.

When the operator retracts the trigger 21 thus countering the action of the spring 26, he/she disengages the pin 22 from the receiving seat 24 and may move the lever 11 in rotation, thus causing the relative sliding of the clamping pins 15 with respect to the eccentric grooves 13', 14' up to the disengagement of the pins 15 from the grooves themselves, as shown in FIGS. 7 and 8.

At this point, the plates 31, 32 of the multi-coupling device 30 may be separated.

Advantageously, during the movement of the lever 11, there is no need for the operator to act on the trigger 21 by keeping it in retracted position, and this thanks to the specific curved profile of the upper edge 23' of the flange 23. Indeed, when the operator releases the trigger 21 after disengaging the pin 22 from the first seat 24, it is sufficient to carry out a minimum rotation of the lever 11 so the pin 22 is out of axis with respect to the first seat 24, and then the operator may release the trigger 21 and the spring 26 will tend to push the pin 22 of the trigger against the curved upper edge 23' of the flange 23.

At this point, the operator may continue rotating the lever 11 until the pin 22, pushed by the spring 26, engages in the second receiving seat 25, thus locking the lever 11 again, this time in an uncoupling condition of the plates 31, 32 of the multi-coupling device 30.

Advantageously, the second receiving seat 25 may be configured so that when the operator is to couple the plates 31, 32 of the multi-coupling device 30 according to the present invention, it will be sufficient to rotate the lever 11 without needing to activate the trigger 21, or such second receiving seat 25 may be configured so as to require the action of the operator on the trigger 21 also to couple the plates. In the first case, the configuration of the edges of the second seat 25 is such whereby the pin 22 is led to disengage from the seat 25 itself when the user rotates the lever 11. Once the rotation operation of the lever 11 is complete, with plates 31, 32 connected, the pin 22 of the trigger 21 is automatically triggered in the first seat 24 in the safety locked position (shown in FIG. 5) and this again thanks to the specific profile of the edges of the seat 24 and of the edge 23' of the flange 23.

The typical union of the functionalities of a multi-coupling connection, i.e. the possibility of connecting/disconnecting several hydraulic and/or pneumatic lines with quick couplings and/or electrical connectors with one action alone, with the functionalities obtained by the coupling/uncoupling device provided with safety means adapted to prevent accidental uncoupling according to the present invention that allows operating the multi-coupling device using one hand alone both in connection step and in disconnection step, is the main advantage of the present invention.

The coupling/uncoupling device according to the present invention allows to accomplish the task and achieve the preset objects of the invention.

The present invention was described by way of non-limiting embodiments, but it is understood that variations and/or modifications may be made by a person skilled in the art, without departing from the relative scope of protection, as defined in the appended claims.

The invention claimed is:

1. A coupling/uncoupling device of a multi-coupling device for a simultaneous connection of a plurality of hydraulic, electrical, and/or pneumatic lines, comprising:
   a movable plate;
   a fixed plate, the movable plate and the fixed plate each supporting a plurality of quick semi-couplings;
   a pair of planar elements each hinged on one side of the movable plate; and
   a safety locking device comprising a trigger adapted to be operated by a user and associated with one of said planar elements in a translatable manner,
   further comprising a lever adapted to be operated by the user and connected to one of said planar elements, wherein each of said planar elements has an eccentric guide or groove configured to receive a clamping pin provided on said fixed plate so that an action of said eccentric guide or groove on said pin causes a nearing of the movable plate to the fixed plate and the connection of the quick semi-couplings due to an action of the user on said lever
   wherein said trigger of said safety locking device is slidingly associated with a first planar element of said pair of planar elements connected to said lever which comprises a handle adapted to be gripped by the user, said trigger and said handle of said lever being mutually positioned so that the user is enabled to grip the handle with a palm of said user's hand and operate said trigger with said user's fingers of the same hand, wherein said trigger comprises a first portion adapted to be operated by said user with one finger and projecting outward from said first planar element, and a second pin portion projecting from said planar element toward an inside of the coupling/uncoupling device, wherein said safety device further comprises a first receiving seat configured to receive said second pin portion of said trigger, made on a body of said movable plate, and a second receiving seat, also made on said body, for said second pin portion of said trigger.

2. The coupling/uncoupling device according to claim 1, wherein said first receiving seat and said second receiving seat are made on a flange that is integral with said movable plate and has a curved-profile upper edge.

3. The coupling/uncoupling device according to the claim 2, wherein said first receiving seat and second receiving seat are made on the curved-profile upper edge of said flange.

4. The coupling/uncoupling device according to claim 3, further comprising an elastic member placed between said trigger and a first planar element of said pair of planar elements and acting to keep said trigger in an advanced position in which, with the lever lowered, the pin of said trigger is engaged in said first receiving seat.

5. The coupling/uncoupling device according to claim 4, wherein edges of the second receiving seat are configured such that the pin of said trigger is led to disengage from the seat itself when the user rotates the lever in a direction that induces a mutual nearing of the fixed and movable plates.

\* \* \* \* \*